April 23, 1940.  R. W. DINZL  2,198,049
PRESS
Filed June 23, 1937  3 Sheets-Sheet 1

INVENTOR
RICHARD W. DINZL
BY
ATTORNEY

April 23, 1940.  R. W. DINZL  2,198,049

PRESS

Filed June 23, 1937  3 Sheets-Sheet 2

INVENTOR
RICHARD W. DINZL
BY
ATTORNEY

April 23, 1940.   R. W. DINZL   2,198,049
PRESS
Filed June 23, 1937   3 Sheets-Sheet 3

INVENTOR
RICHARD W. DINZL
BY
ATTORNEY

Patented Apr. 23, 1940

2,198,049

UNITED STATES PATENT OFFICE 2,198,049

PRESS

Richard W. Dinzl, Narberth, Pa., assignor, by mesne assignments, to The Baldwin Locomotive Works, a corporation of Pennsylvania Application June 23, 1937, Serial No. 149,940

6 Claims. (Cl. 29—86)

This invention relates generally to presses and more particularly to a hydraulically operated press which is specifically adapted for pressing bearing bushings on to automobile axles or for pressing together other complementary members, although certain features of the machine may be applicable to other fields.

For purposes of illustration, the machine is shown and described specifically in connection with pressing bearing bushings on to axles or shafts although the terms bushing and shaft are herein used to refer broadly to any complementary members that are to be pressed together.

It is well known that a bearing bushing pressed too tightly on to a shaft will ultimately crack while on the other hand a bushing not pressed sufficiently tightly on to the shaft may ultimately revolve thereon.

It is an object of my invention to provide an improved apparatus having a movable member that is normally operative to exert a force on an object only within predetermined limits of force. A more specific object is to provide an improved apparatus that will press a yieldable object such as a bushing on to a shaft only within predetermined limits of force. A further object is to provide an improved press which will automatically render the machine inoperative when a bushing has such a fit that a pressing force would be required greater than or less than the desired limits. A still further object therefore is to provide an improved press which functions automatically to select bushings that will properly fit their shafts.

Another object is to provide an improved machine of the foregoing type that is economical in construction, operation and maintenance and is relatively simple and compact combined with sturdiness and ease of operation. A still further object is to provide an improved control system operative to perform selective functions in accordance with predetermined force resisting conditions.

Further objects and advantages will be more apparent to those skilled in the art from the following description of the accompanying drawings in which.

Figures 1, 4:
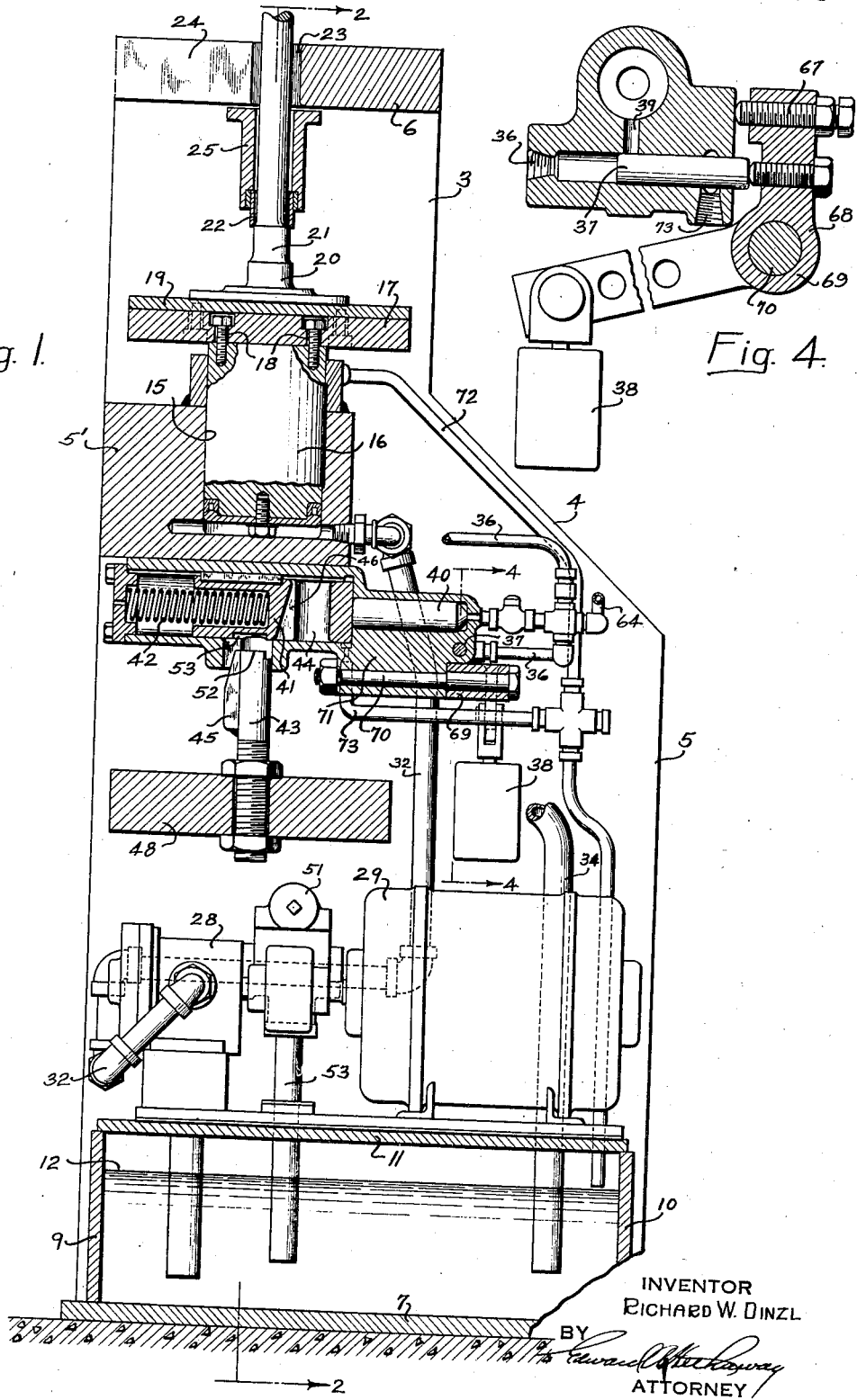
Fig. 1 is a vertical section extending through the depth of the machine and taken substantially on the line 1—1 of Fig. 2.
Fig. 4 is a vertical section taken on the line 4—4 of Fig. 1.
Figure 2:
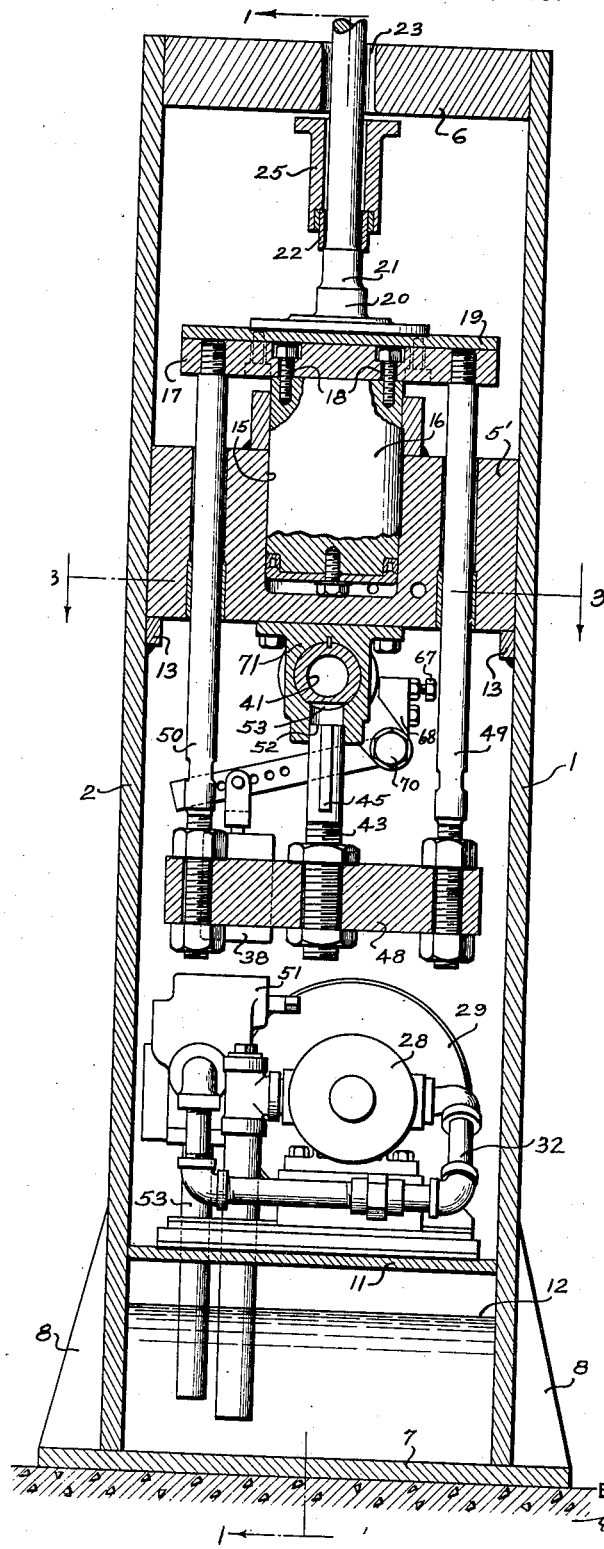
Fig. 2 is a section taken substantially on the line 2—2 of Fig. 1 but looking toward the rear of the machine.
Figure 3:
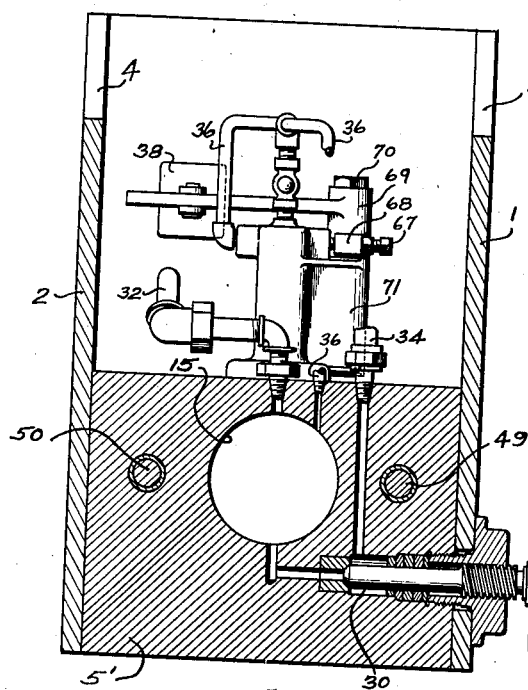
Fig. 3 is a section taken on line 3—3 of Fig. 2.

In the particular embodiment of the invention which is disclosed herein merely for the purpose of illustrating one specific form among possible others that the invention might take in practice, I have provided in Fig. 2 a press frame having two plate metal sides 1 and 2 which as shown in Fig. 1 have a relatively narrow depth at the upper portion 3 connecting by an inclined portion 4 into a lower portion 5 equal to the maximum depth of the machine. The inclined portion 4 is at the rear of the machine. The side plates are secured together at an intermediate portion by a cylinder block 5' located toward the front side of the frame. A stationary platen 6 connects the upper ends of the side plates while a preferably plate metal base 7 reinforced by ribs 8 supports the frame. Front and rear vertical plates 9 and 10, Fig. 1, and a horizontal plate 11 form not only an oil sump 12 but also provide a highly compact and rigid base structure capable of having its various parts welded together in a very effective manner. The cylinder block 5' may be welded or otherwise suitably secured to the side plates while abutment strips 13 may be welded to the side plates to support the cylinder block 5' against its downward thrust. A main cylinder 15, Fig. 1, has a ram 16 carrying a platen 17 removably secured thereto by bolts 18. Any suitable plate 19 may be placed on top of the platen to suitably support any particular product such as an automobile axle 20. This axle has a surface 21 on which a bushing 22 is normally forced. The axle projects upwardly through a suitable opening 23 in upper platen 6 which has a slot 24 extending from the front of the machine to opening 23, thereby permitting axle 20 to be placed in position and removed therefrom from the front of the machine. The bushing fixture 25 receives bushing 22 and is of sufficient diameter to bridge over slot 24 and provide an ample bearing contact with the crosshead 6 during the pressing operation to be described shortly.

The control and operating system together with its structure will be more readily understood by describing the sequence of operations.

*The normal bushing fit.*—Assuming that the bushing 22 and axle 20 are in the position as shown in Fig. 1, a positive displacement pump 28 is driven by a motor 29 both of which are suitably supported upon sump cover plate 11. As shown in the diagrammatic view of Fig. 5, a valve 30 is normally opened, thereby permitting pump pressure to circulate through pipe 32, cylinder 15 and pipes 33 and 34 to sump 12. To move ram 16 upwardly, valve 30 is closed by a handle 35 whereupon pump pressure accumulates in cylinder 15 to raise ram 16 together with axle 20 and bushing sleeve 25, Fig. 1, against crosshead 6. It is now assumed that the bushing fit is normal and hence the fit will offer a predetermined minimum resistance to any movement of the bushing on to the axle. This minimum resistance will be overcome by a pressing force of say 2000 pounds. Such pressure is built up by the pump and is transmitted through a pipe 36, Fig. 5, to move a pressure responsive plunger 37 to the left against the action of a weight 38. When plunger 37 moves, it uncovers a port leading to a pipe 39 whereupon the pump pressure is transmitted to a gag plunger 40. This plunger moves a gag block 41 to the left against the action of a spring 42. When the gag block has moved to its full extreme left position, there is brought into register with each other a rod 43 and an opening 44 in the gag block. An inclined key 45 secured to shaft 43 also registers with an inclined recess 46 adjacent opening 44 in the gag block. It is thus seen that when the gag block is in its extreme left position, rod 43 may move freely upwardly to the full depth of the block. This rod is connected by a crosshead 48 to side rods 49 and 50 which in turn are connected to crosshead 17. Hence ram 16 may move platen 17 and the axle upwardly to completely force the cylindrical portion 21 of the axle into the bushing for its full length. When the bushing and axle are thus pressed into position, the operator moves handle 35 to open valve 30 whereupon pressure from cylinder 15 is discharged through pipes 33 and 34 to the sump as well as releasing pressure from plungers 37 and 40 whereupon they are respectively returned to the position shown in Fig. 1 by weight 38 and spring 42. At the same time ram 16 and rod 43 move downwardly under gravity.

Figure 5:
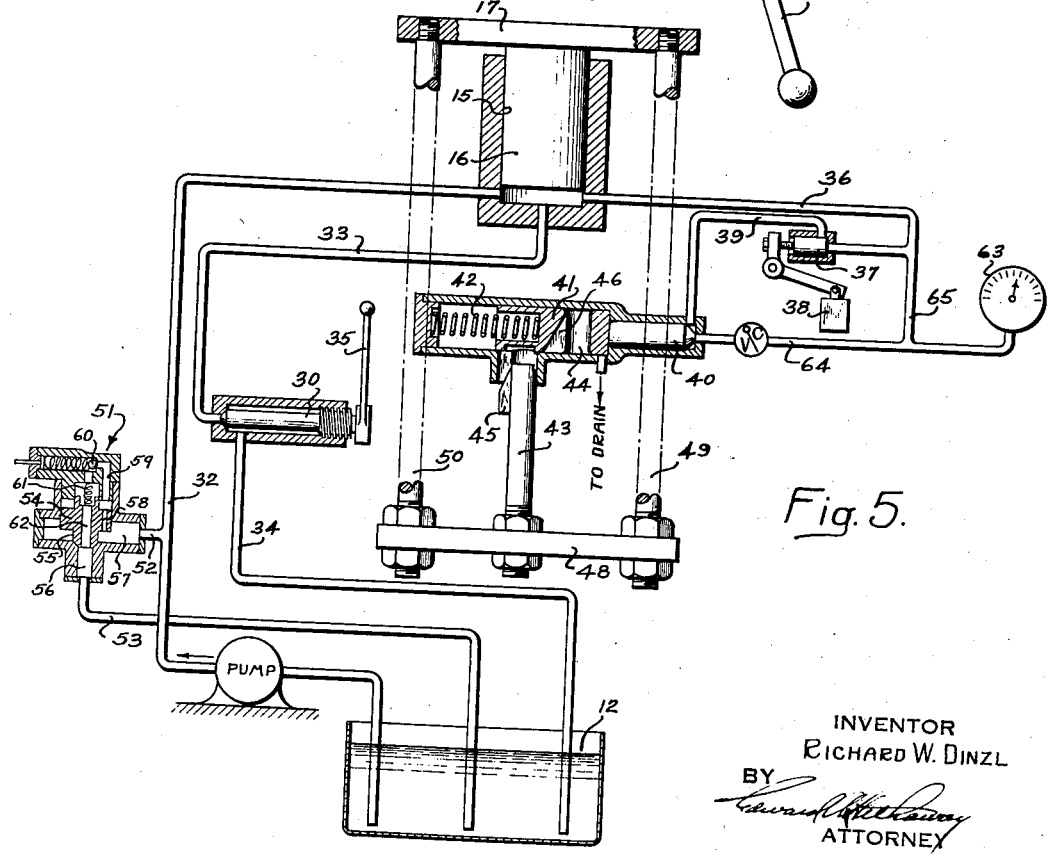
Fig. 5 is a diagrammatic view of the control system.

*Bushing fit too loose.*—If the bushing fit is too loose, that is, the bushing can be pressed on to the axle with a force less than the assumed minimum force of 2,000 pounds, ram 16 will immediately move upwardly under sub-minimum pump pressure to force cylindrical portion 21 of the axle into at least a portion of the length of bushing 22. However, this ease of upward movement of the ram is accompanied by rod 43 moving upwardly so as to bring a stop portion 52 into the recess 53 formed in the under side of gag block 41. Thus the gag block serves to mechanically limit the upward movement of rod 43 and consequently limit rods 49, 50 and platen 17 so that the axle cannot be forced any further into the bushing. It will be understood that the gag block does not move away from its extreme right hand position during the initial portion of this operation by reason of the pressure in cylinder 15 being below the minimum normal and accordingly plunger 37 cannot be moved against the action of weight 38 which responds only to a pressure equal to or greater than the minimum normal. Of course, in the latter portion of the operation such as when stop 52 enters recess 53, then the gag block must remain in its right hand position even though the pump pressure may increase by reason of the ram being held against movement by the interengagement of rod 43 and block 41. Hence pipe 39 will not be opened by plunger 37 and therefore gag plunger 40 remains inoperative in its right hand position as shown in Figs. 1 and 5. With the machine now inoperative, the operator realizes that the bushing fit is too loose and accordingly opens valve 30 to return ram 16 to its down position whereupon the axle with its partially pressed on bushing is removed from the machine. This bushing is then suitably removed from the axle and either discarded or used for an axle of different diameter.

*Bushing too tight.*—In case the bushing fit should require an abnormally high force, say above 6,000 pounds, the machine is again rendered inoperative before the bushing is completely forced on to its axle. Assuming that the operator has closed valve 30 and that fluid pressure is built up under ram 16 to give a press fit of 2,000 pounds or more, the cylinder pressure will open plunger 37 and move plunger 40 and gag block 41 to the left, thereby providing an unrestricted path of movement for stop rod 43. However, due to the assumed excessive tightness of the bushing and axle, the pump pressure will now continue to build up in excess of that necessary to produce the desired upper limit of force of 6,000 pounds without any appreciable movement of ram 16. When the pump pressure reaches its upper limit, a valve mechanism generally indicated at 51 opens to bypass fluid through pipes 52 and 53 to sump 12. This valve mechanism can be of any suitable relief valve type, one form of which is specifically shown herein as comprising a plunger 54 having a valve stem 55 adapted to close an outlet passage 56. Pump pressure accumulates in chamber 57 and normally presses upwardly on the exposed under side of plunger 54, this pressure passing upwardly through a port 58 to the upper side of plunger 54 and thence through a passage 59 normally closed by a spring pressed check valve 60. A spring 61 together with the pressure acting on the upper side of plunger 54 will normally hold the valve closed although when the pressure exceeds the predetermined maximum value, check valve 60 opens to discharge fluid from the upper side of plunger 54 through passages 59 and 62 to drain pipe 53. Due to the passage 58 being relatively small, compared to passages 59 and 62, the continued high pressure in chamber 57 will hold the valve 55 in its upper position, thereby permitting pump fluid to bypass directly from chamber 57 to outlet 56. Consequently the ram 16 and axle 20 will not be moved upwardly any further and accordingly the bushing will be only partially pressed on the axle. The operator will then release valve 30 by handle 35 to permit platen 17 and ram 16 to lower by gravity. Upon opening valve 30, pump pressure in pipe 32 will drop and accordingly relief valve 55 will close whereupon the next operation may be started. It will of course be understood that the spring of check valve 60 may be suitably adjusted to vary the pressure at which the relief valve opens. The axle and bushing are then removed from the machine and the bushing suitably taken off of the axle.

If desired, a suitable pressure gauge 63, Fig. 5, may be employed to determine the pressure to which the plunger 16 responds. This gauge is connected by a check valve control pipe 64 to the cylinder of gag plunger 40 and also to the main cylinder by a pipe 65. Also as shown in Fig. 4, the extent of movement of pressure responsive plunger 37 before it uncovers the passage port 39 can be adjusted by a screw 67 threaded in a lug of a bellcrank 68 supporting weight 38. As seen in Fig. 1, the bellcrank 68 has a hub portion 69 journalled upon a bolt 70 which is suitably secured in a lower portion of the integral structure 71 for housing plunger 40 and the gag block 41. Also a suitable leakage pipe 72 may lead from the upper end of cylinder 15 to the sump 12 and similarly a leakage pipe 73 leads from the right hand of gag block 41 to the drain.

From the foregoing disclosure it is seen that my improved press and control system are adapted to insure that bushings will be pressed on to axles only between predetermined upper and lower limits of force. Any bushings and axles having a fit that is too loose or too tight will be automatically rejected by rendering the machine inoperative. Thus the machine is adapted to select rapidly and with minimum loss of time only those bushings which will be properly fitted. The whole operation is controlled from the single hand lever 35 and its valve 30 thus reducing the operation to a minimum.

It will of course be understood that various changes in details of construction and arrangement of parts may be made by those skilled in the art without departing from the spirit of the invention as set forth in the appended claims.

I claim:

1. In combination, an apparatus having opposed platens, a hydraulic ram and cylinder for moving one of the platens upwardly from said cylinder, a gag block disposed beneath said cylinder, side rods extending down from said movable platen to the under side of said gag block, and a limit stop rod supported by the lower ends of said side rods for cooperation with said gag block by movement toward said cylinder in a direction axially thereof.

2. In combination, an apparatus having opposed platens, a hydraulic ram and cylinder for moving one of said platens, a gag block, a stop element movable with said movable platen into the path of said gag block, means for moving said gag block out of the path of said stop element automatically upon occurrence of a predetermined pressure in said cylinder, and means for positively locking said gag block against movement out of the path of said stop element in the event of said movable platen having an initial predetermined extent of movement before said cylinder pressure reaches a predetermined value.

3. The combination set forth in claim 2, further characterized in that said means for preventing movement of the gag block out of the path of the stop element includes means forming a shoulder on said gag block adapted to be laterally engaged by said stop element.

4. In combination, an apparatus having opposed platens, a hydraulic ram and cylinder for moving one of said platens, a gag block movable transversely of the axis of said cylinder and having an inclined surface extending generally in an axial direction, a limit stop rod connected to said movable platen and having an inclined surface complementary to the inclined surface of said gag block whereby upon initial interengagement between said inclined surfaces said gag block is positively moved out of the path of movement of said stop rod, and means for initially operating said gag block automatically in accordance with predetermined pressure conditions in said cylinder.

5. In combination, an apparatus having opposed platens, a hydraulic ram and cylinder for moving one of said platens upwardly from said cylinder, means forming a transverse guideway supported by and immediately beneath said cylinder, a gag block slidably supported by said guideway, a limit stop rod connected to said movable platen and disposed beneath said gag block substantially in alignment with said cylinder for movement axially toward the same whereby the hydraulic operating forces in the cylinder oppose the force created by axial engagement of said stop rod with said gag block, and means for moving said gag block out of the path of said stop rod automatically upon occurrence of a predetermined operating condition.

6. In combination, an apparatus having opposed platens, a hydraulic ram and cylinder for moving one of said platens, a housing supported by said cylinder beneath the same, said housing having a guideway extending transversely of the cylinder axis, a gag block slidably supported by said guideway, a limit stop rod connected to said movable platen for movement in an axial direction to effect cooperation with said gag block and thereby prevent movement of said platen in the event that a predetermined resistance to movement thereof is not built up, said housing having a bore and plunger therein for transversely moving said gag block, and a pressure operated valve biased to closed position but operative to open upon occurrence of a predetermined pressure and thereby supply operating fluid to said bore so as to move said gag block out of the path of said limit stop rod.

RICHARD W. DINZL.